(12) United States Patent
Campbell et al.

(10) Patent No.: US 8,108,836 B1
(45) Date of Patent: Jan. 31, 2012

(54) SYSTEM AND METHOD FOR DEFINING SOFTWARE MANAGEMENT

(75) Inventors: Robert Campbell, Fort Collins, CO (US); Keith Buck, Fort Collins, CO (US); John Diamant, Fort Collins, CO (US); Evan Zweifel, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1510 days.

(21) Appl. No.: 11/580,649

(22) Filed: Oct. 13, 2006

(51) Int. Cl.
*G06F 9/44* (2006.01)
(52) U.S. Cl. .......................... 717/120; 717/127
(58) Field of Classification Search .................. None
See application file for complete search history.

(56) References Cited

U.S. PATENT DOCUMENTS

| | | | |
|---|---|---|---|
| 7,103,874 B2 * | 9/2006 | McCollum et al. | 717/121 |
| 7,603,668 B2 * | 10/2009 | Zweifel et al. | 717/174 |
| 7,765,538 B2 * | 7/2010 | Zweifel et al. | 717/168 |
| 7,954,090 B1 * | 5/2011 | Qureshi et al. | 717/127 |
| 7,996,814 B1 * | 8/2011 | Qureshi et al. | 717/120 |
| 8,001,527 B1 * | 8/2011 | Qureshi et al. | 717/120 |
| 2003/0033313 A1 * | 2/2003 | Zweifel et al. | 707/100 |
| 2004/0015938 A1 * | 1/2004 | Taylor | 717/168 |
| 2007/0168956 A1 * | 7/2007 | Moore et al. | 717/120 |
| 2008/0104573 A1 * | 5/2008 | Singla et al. | 717/120 |

OTHER PUBLICATIONS

James Chapman; Software Development Methodology [online]; 2004 [retrieved on Sep. 15, 2011], pp. 1-5. Retrieved from the Internet: <URL: http://www.hyperthot.com/pm_sdm.htm>.*
Terasolf Inc., Software Project Management Plan [online], May 8, 2004 [retrieved on Sep. 15, 2011]; pp. 179. Retrieved from the Internet: <URL: http://www.buckley-golder.com/papers/mbg_SPMP_ProjectManagement.pdf>.*

* cited by examiner

*Primary Examiner* — Thuy Dao
*Assistant Examiner* — Hanh Bui

(57) ABSTRACT

A method for updating software is disclosed. The method includes accessing system data associated with a client and determining known issues to be resolved associated with the client based on the system data. The method also includes accessing system update preferences associated with the client, the system update preferences representing a minimum system status level and determining if the client satisfies the minimum system status level based on the update preferences and based on the system data.

23 Claims, 5 Drawing Sheets

SYSTEM AND METHOD FOR DEFINING SOFTWARE MANAGEMENT

TECHNICAL FIELD

The present invention relates to computer software. More specifically, embodiments of the present invention relate to management of computer software, including defining software status.

BACKGROUND ART

Many times, after software is released (e.g., sold to a customer), updates are provided to either fix problems with the software or to provide enhanced features of the software. A software update refers to the creation and availability of a new version of a particular computer software product. Each time a software program is changed, the programmers and company doing the work decide on how to distribute the changes or the changed system or program to those people using it.

Managing software updates can be troublesome to many users. Many times, patches do not clearly state what problems they attempt to fix or identify the particular software being updated. In addition, many times numerous updates for the same software package are offered. A user may be confused as to which update (if any) is needed to fix particular issues.

The problems associated with updating software are magnified in a multi-system environment where numerous systems may or may not need updates. In some prior art solutions, the installation of software updates is done identically across all systems where all systems are given the same software updates.

The disadvantage of this approach is that in mission-critical environments, downtime must be minimized. In solutions that force all systems to the same software levels, an individual system might be forced to shut down applications as it installs software and patches of no value to it. In the worst case scenario, the "update" may actually be a regression from the initial state.

SUMMARY OF THE INVENTION

Embodiments of the present invention include a method for defining a software status based on a configurable and arbitrary set of issues which are of concern to a client. The method includes accessing system data associated with a client and determining known issues to be resolved associated with the client based on the system data. The method also includes accessing system update preferences associated with the client, the system update preferences representing a minimum system status level and determining if the client satisfies the minimum system status level based on the update preferences and based on the system data.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
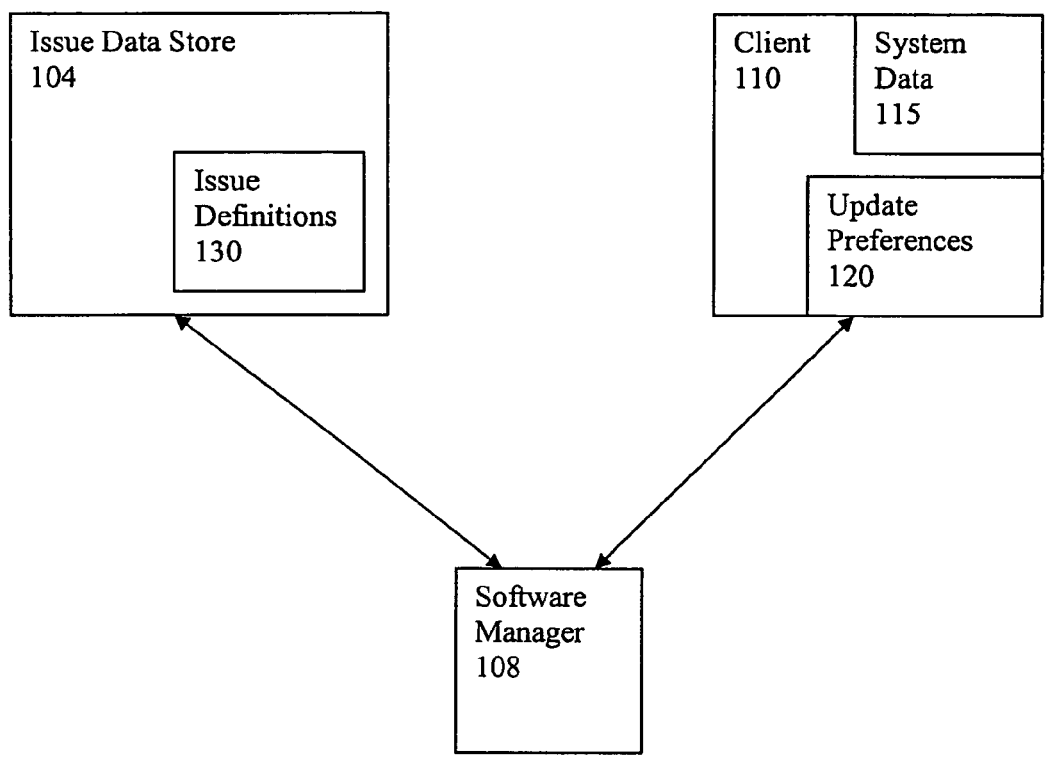
FIG. 1 is a block diagram of an exemplary system for defining a software status for a client in accordance with embodiments of the present invention.

Embodiments of the present invention provide a system and method for determining whether a software update is necessary based on a configurable and arbitrary list of issues that may be relevant to that software. In one embodiment of the invention, software issues are defined using global IDs that uniquely identify an issue across a universe of systems. These issues can be grouped by type and usually specify the impacted software and minimum patches (if any) needed to resolve the issue.

One embodiment of the invention includes comparing two systems with different software and patches installed and finding them to be considered "equivalent" by the functionality provided and resolved issues. Currently many tools can manage systems via a "desired state" defined as "patch X is installed". In accordance with the present invention, the important value is that "patch X" fixes "security issue A". If "patch Y" also fixes "security issue A," the present invention would consider the two systems as being at the same level (e.g., minimum system status) with respect to "issue A" while conventional systems would flag the systems as being different.

In one embodiment of the invention, a list of exposed issues (e.g., security issues, critical fixes, patches, revisions, etc.) associated with a system (or a plurality of systems) is generated. The list of exposed issues can be generated by identifying the particular software installed on a particular system (or systems) and comparing the identified software to a list of known issues associated with particular software. From the list of identified issues associated with the system (or systems), particular issues can be selected to "fix."

The approach of the present invention switches update focus from packaging (e.g., does a system have the latest versions of software) to actual problems or "issues" associated with a single or multiple systems. In this approach, one or more "fix" can address and fix a particular issue. The present invention is "issue" focused with respect to managing software as opposed to the approach of conventional systems that look to see if the system has all of the latest updates or looks to see if two systems have the same software updates in order to consider them equivalent.

The benefit of the present invention is that in a multi-system environment, it can be insured that all systems are protected (e.g., fixed) from particular issues while they may or may not have the same installed software or software revisions. For example, two systems that have "issue A" can be considered equally "protected from issue A" by different software or software revisions, as long as the different software or software revisions protect from "issue A." Conventional software management tools would require two systems to have the same exact software versions (e.g., patches, revisions, configurations, etc.) for them to be considered equivalently protected or equivalently "up to date."

The present invention allows a user to specify which "issues" are important for a given system or set of systems. As a result, it can be easily determined if the system is protected from the selected issues. It can also be easily determined if a plurality of systems are protected from selected issues even if the plurality of systems have different installed software, software patches, software revisions, etc.

In some cases, the latest update is not always the best update for particular systems. For example, many times a new update is later updated again because of problems discovered in the update. A user may want to choose an older, more proven update over the latest update (e.g., newest released) to improve system reliability and to decrease downtime. As long as the older version fixes a particular issue of interest, the system is considered "up to date." A system with a newer update would be considered equivalent to a system with an older update as long as the two systems were protected from the same issue of interest.

FIG. 1 is a block diagram of an exemplary system 100 for managing software in accordance with embodiments of the present invention. System 100 can be used to determine if Client 110 is protected from particular "issues" of interest. System 100 includes a client 110, an issue database (e.g., issue catalog) 104 and a software manager 108.

In one embodiment of the invention, the software manager 108 accesses a list of known issues 130 from the issue data store 104 and provides the list of known issues 130 to the client 110. In one embodiment of the invention, the list of known issues 130 may be compiled from a plurality of sources. For example, a plurality of software vendors may each provide a list of known issues which can adversely affect particular software. In this embodiment of the invention, a centralized issue data store 104 may pull the list of known issues 130 from a plurality of vendors. It is appreciated that the list of known issues 130 may be generated in any number of ways in accordance with embodiments of the present invention.

The issue definitions 130 (e.g., known issues) may include an "issue" identifier and an associated description of the issue. A particular issue definition may also include instructions to fix a particular issue. It is appreciated that in accordance with embodiments of the present invention, more than one "fix" may be provided (e.g., considered equivalent) for a given "issue." In essence, two clients with different software may be considered "fixed" from a particular "issue" because multiple "fixes" are considered functionally equivalent for a given issue even if the "fixes" are different (e.g., different software versions).

In one embodiment of the invention, the issue definition includes an associated rating. The rating is a representation of the importance (e.g., severity) of the "issue." The rating may be based on any number of factors including user satisfaction with the update, the number of downloads, the time since release, etc. In one embodiment of the invention, the rating is considered by the software manager 108 when determining whether or not the client 110 is "up to date." In one embodiment of the invention, a user can specify a minimum rating of updates in the update preferences 120.

Once the list of known issues is compiled and provided to the client 110, the client 110 can indicate particular issues that are important (e.g., wants protection from). The selection of important issues can be performed in any number of ways, including, for example, a graphical user interface provided at client 110. In one embodiment of the invention, the update preferences can be used to determine a minimum system status level indicating the minimum level of protection from "issues" important to a particular client. In one embodiment of the invention, the update preferences includes a collection of globally unique issue identifiers. In one embodiment of the invention, the IDs are arbitrarily assigned. In one embodiment of the invention, the issue IDs are associated with recommended software updates or changes.

In response to receiving user specified "issues" (e.g., included in update preferences 120), the software manager 108 determines if the client 110 is protected from the specified issues. It is appreciated that the update preferences 120 may also include other information (e.g., specified by the client) such as "issues of interest" not included in the list of known issues 130 provided by the software manager 108.

It is appreciated that the elements of system 100 can reside on a single system or can reside on multiple systems. For example, the issue database 104 could be remote to both the client 110 and the software manager 108. In addition, the software manager 108 can be remote to both the client 110 and the issue data store. In one embodiment of the invention, the elements of system 100 communicate with each other over a network, such as the Internet.

The client 110 includes update preferences 120 and system data 115. In one embodiment of the invention, the software manager 108 determines which of the known issues 130 affect the client 110 based on the system data 115 and the update preferences 120. In one embodiment of the invention, the system data 115 includes an inventory of the software installed on the client 110.

Figure 2:
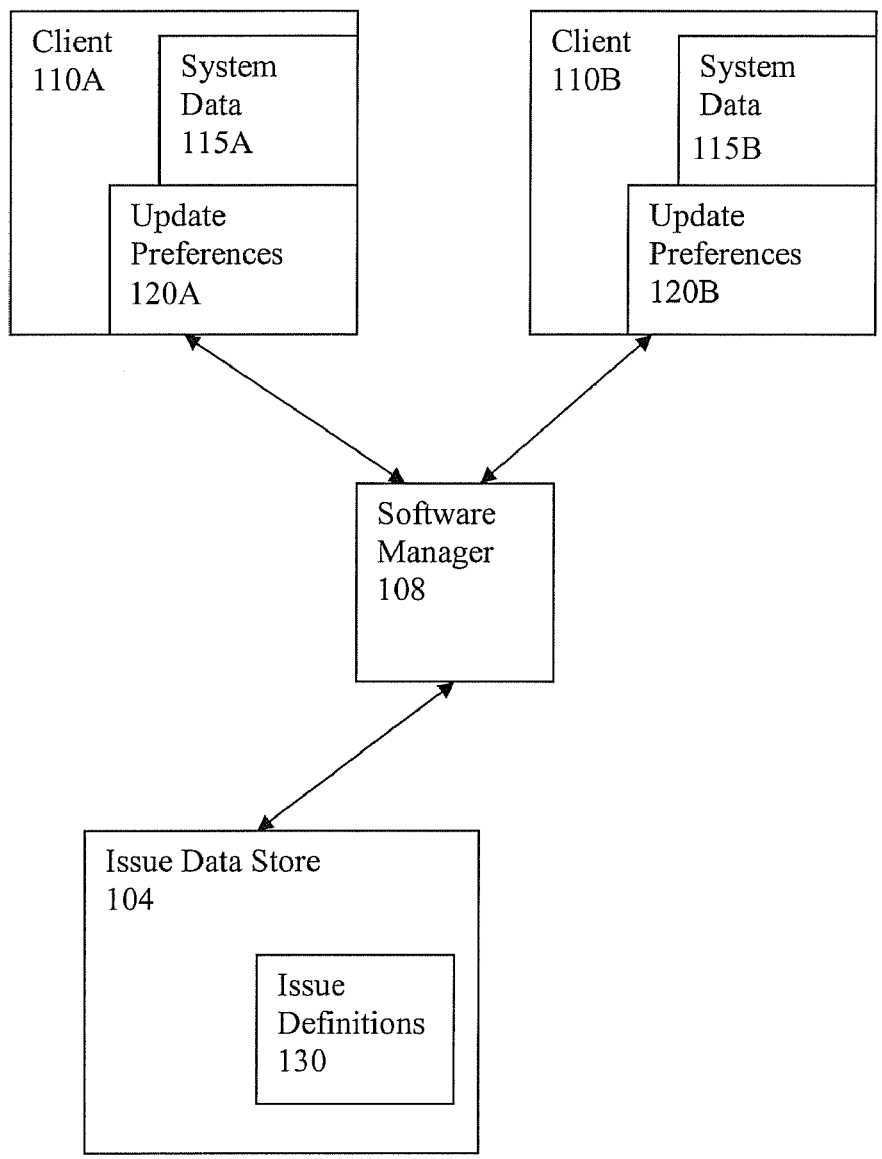
FIG. 2 is a block diagram of an exemplary system for defining a software status for a plurality of clients in accordance with embodiments of the present invention.

FIG. 2 is a block diagram of an exemplary system 200 for managing software for a plurality of clients (e.g., clients 110A and 110B) in accordance with embodiments of the present invention. System 200 is similar to system 100 in figure with the exception of having multiple clients 110A and 110B.

In one embodiment of the invention, the software manager 108 accesses the system data 115A and 115B from the clients 110A and 110B. In one embodiment of the invention, the system data is specific to an individual client, however, it is appreciated that the system data may represent a number of systems. For example, the system data 115A could include the same information as system data 115B or can represent only the system data associated with client 110A.

In one embodiment of the invention, the update preferences 120A and 120B are client specific. However, it is appreciated that a plurality of clients can share the same set of update preferences.

Figure 3:
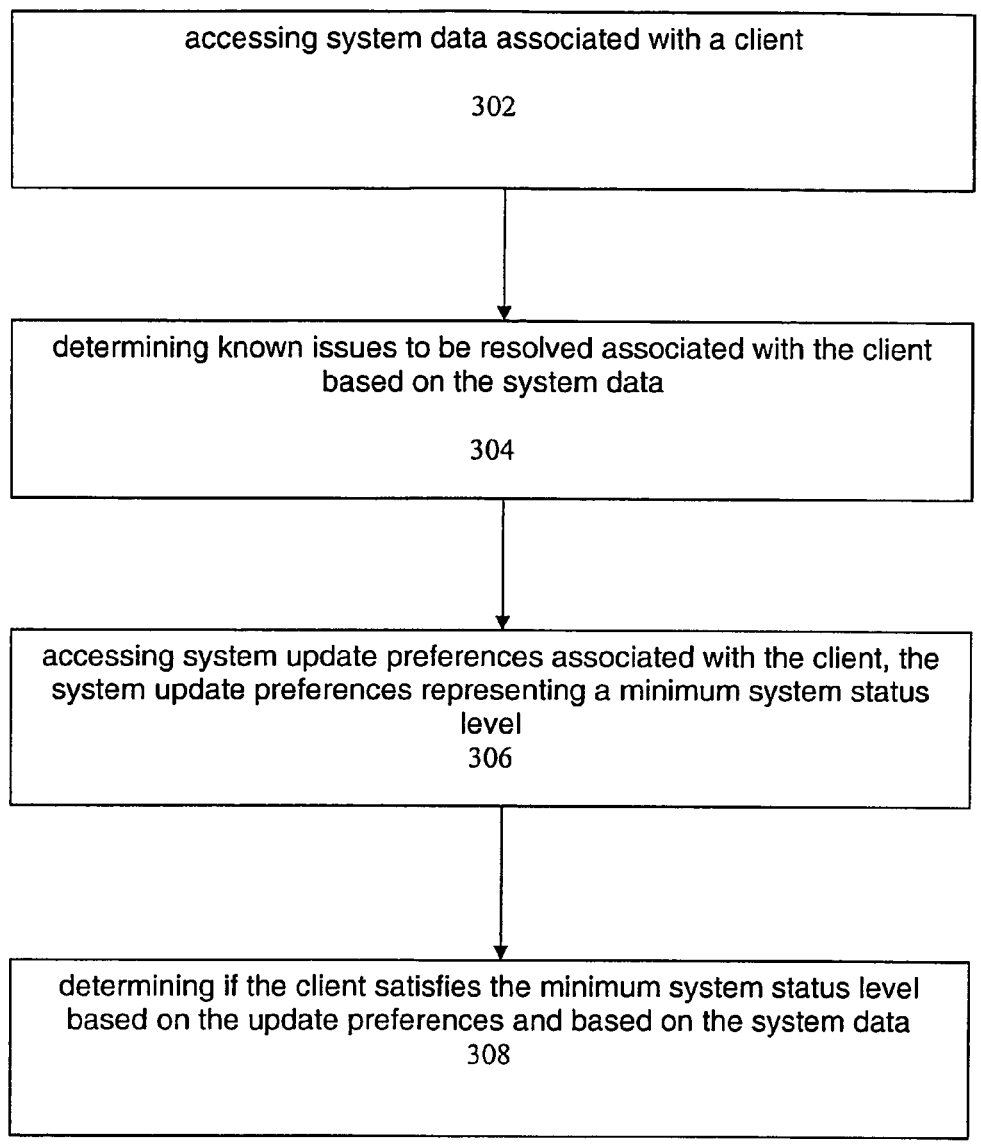
FIG. 3 is a data flow diagram of an exemplary method for defining a software status for a client in accordance with embodiments of the present invention.

FIG. 3 is a data flow diagram of an exemplary method 300 for managing software in accordance with embodiments of the present invention. At step 302, method 300 includes accessing system data associated with a client. In one embodiment of the invention, system data includes a listing of software associated with the client. The system data may also include information about the client such as performance information, hardware information or any other information associated with the client.

In one embodiment of the invention, the system data is accessed from a software manager which can be a local application or a remote application. In the remote implementation, the software manager may communicate with the client over a network such as the Internet.

At step 304, method 300 includes accessing known issues to be resolved associated with the client based on the system data. In one embodiment of the invention, after the system data is accessed, a list of known "issues" is accessed and based on the system data a list of issues the client may be exposed to is generated and provided to the client. At that time, the client may choose which "issues" are of interest. The selected "issues of interest" are included in the update preferences. It is appreciated that the update preferences may be selectable through a GUI, for example.

At step 306, method 300 includes accessing the system update preferences associated with the client wherein the system update preferences represent a minimum system status level of protection from particular issues.

At step 308, method 300 includes determining if the client satisfies the minimum system status level based on the update preferences accessed in step 306 and based on the system data accessed in step 302.

In one embodiment of the invention, more than one system configuration (e.g., software patches, revisions, etc.) satisfies the minimum system status level. As long as different configurations "fix" a particular issue of interest, the systems are considered equivalently protected.

In one embodiment of the invention, in response to determining a client fails to satisfy the minimum system status level, the client is provided a report indicating which issues of interest affect the client and what actions are needed to meet the minimum level of system status.

In one embodiment of the invention, a software bundle is provided to the client for bringing the client up to the minimum system status level. It is appreciated that the software bundle (including software updates, revisions, patches, instructions to the client, etc.) can be provided to the client in any number of ways in accordance with the present invention.

Figure 4:
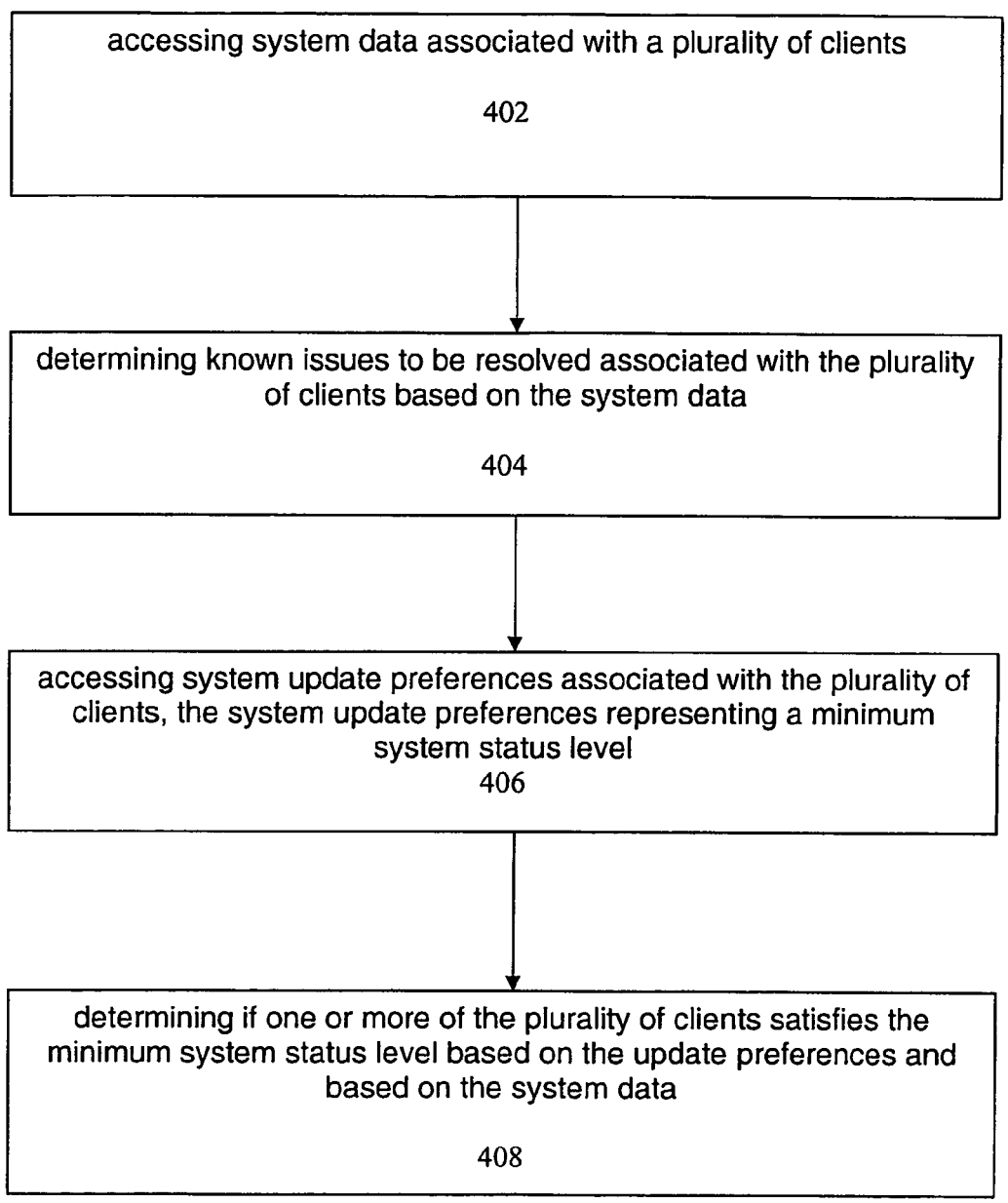
FIG. 4 is data flow diagram of an exemplary method for defining a software status for a plurality of clients in accordance with embodiments of the present invention.

FIG. 4 is a data flow diagram of an exemplary method 400 for managing software for a plurality of clients in accordance with embodiments of the present invention.

At step 402, method 400 includes accessing system data associated with a plurality of clients. In one embodiment of the invention, the system data is unique to a specific client, however, the system data could also be collective system data associated with more than one client.

At step 404, method 400 includes determining known issues to be resolved associated with the plurality of clients based on the system data accessed in step 402. In one embodiment of the invention, after the system data is accessed, a list of known "issues" is accessed and based on the system data a list of issues the plurality client may be exposed to is generated and provided to the clients. At that time, the clients may choose which "issues" are of interest. The selected "issues of interest" are included in the update preferences associated with the clients.

At step 406, method 400 includes accessing system update preferences associated with the plurality of clients wherein the system update preferences represents a minimum system status level.

At step 408, method 400 determining if one or more of the plurality of clients satisfies the minimum system status level based on the system data accessed in step 402 and based on the update preferences accessed in step 406. In one embodiment of the invention, deviations from the minimum system status level are determined.

In one embodiment of the invention, in response to determining one or more of the clients fails to satisfy the minimum system status level, a report is provided to the client (or clients) indicating which issues are not satisfied. In one embodiment, the report also specifies actions for the client to fix the issues that are not satisfied (e.g., indicates software updates, patches, revisions, etc.) that can be used to satisfy the issues of interest.

In one embodiment of the invention, the client is provided the software needed to satisfy the issues of interest and satisfy the minimum system status level for the client.

Exemplary Computer System

Figure 5:
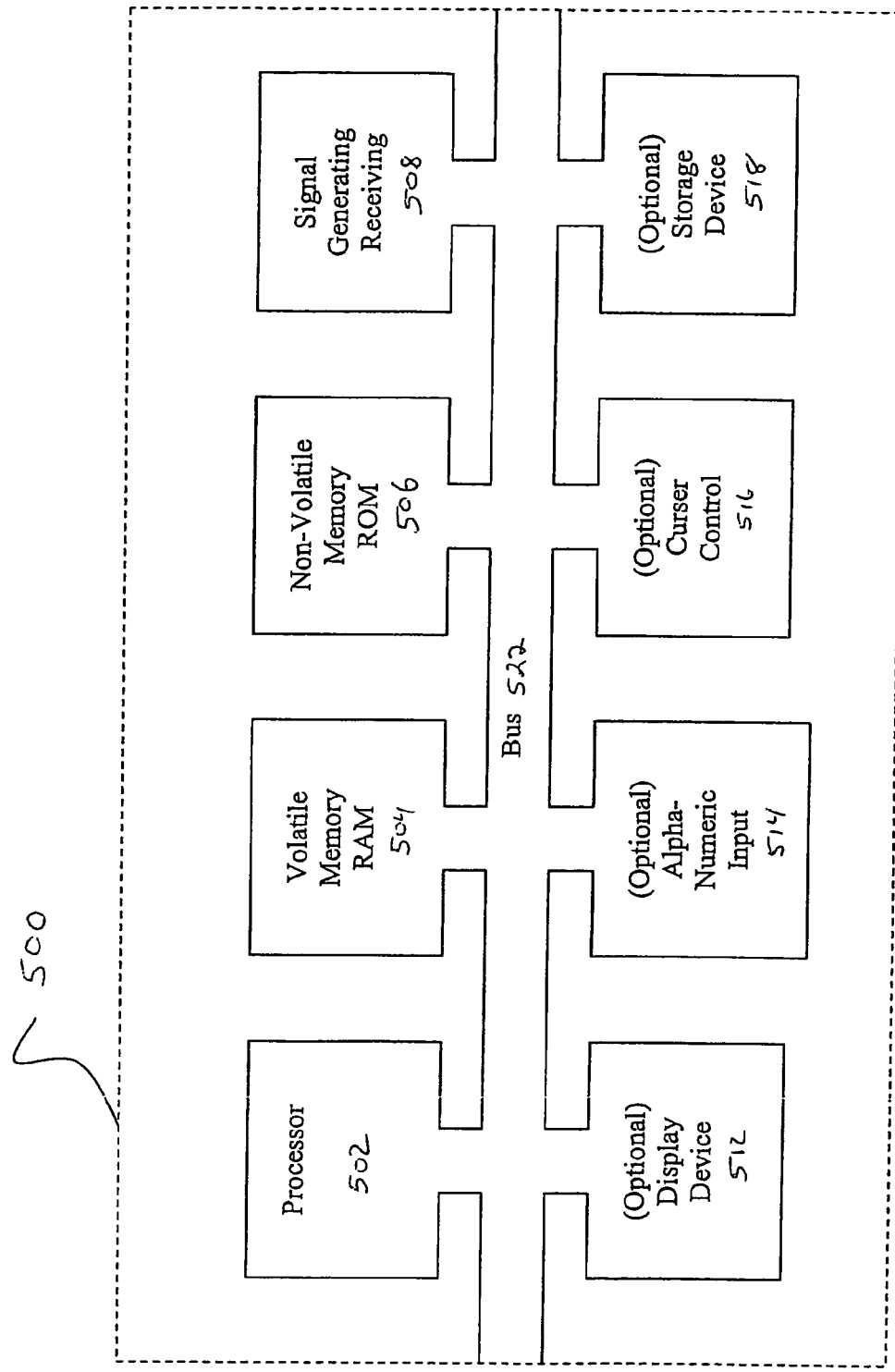
FIG. 5 is a block diagram of an exemplary computer system in accordance with embodiments of the present invention.

With reference to FIG. 5, portions of the present invention are comprised of computer-readable and computer-executable instructions that reside, for example, in computer system 500, which may be used as a part of a general-purpose computer network (not shown). It is appreciated that computer system 500 of FIG. 5 is exemplary only and that the present invention can operate within a number of different computer systems including general-purpose computer systems, embedded computer systems, laptop computer systems, hand-held computer systems, and stand-alone computer systems.

In the present embodiment, computer system 500 includes an address/data bus 522 for conveying digital information between the various components, a central processor unit (CPU) 502 for processing the digital information and instructions, a volatile main memory 504 comprised of volatile random access memory (RAM) for storing the digital information and instructions, and a non-volatile read only memory (ROM) 506 for storing information and instructions of a more permanent nature. In addition, computer system 500 may also include a data storage device 518 (e.g., a magnetic, optical, floppy, or tape drive or the like) for storing vast amounts of data. It should be noted that the software program for outputting information of the present invention can be stored either in volatile memory 504, data storage device 518, or in an external storage device (not shown).

Devices which are optionally coupled to computer system 500 include a display device 512 for displaying information to a computer user, an alpha-numeric input device 514 (e.g., a keyboard), and a cursor control device 516 (e.g., mouse, trackball, light pen, etc.) for inputting data, selections, updates, etc. Computer system 500 can also include a mechanism for emitting an audible signal (not shown).

Furthermore, computer system 500 can include an input/output (I/O) signal unit (e.g., interface) 508 for interfacing with a peripheral device (e.g., a printer, a computer network, modem, mass storage device, etc.). Accordingly, computer system 500 may be coupled in a network, such as a client/server environment, whereby a number of clients (e.g., personal computers, workstations, portable computers, minicomputers, terminals, etc.) are used to run processes for performing desired tasks (e.g., printing, outputting information, etc.).

Embodiments of the present invention, a system and method for updating software have been described. While the present invention has been described in particular embodiments, it should be appreciated that the present invention should not be construed as limited by such embodiments, but rather construed according to the following Claims.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for managing software comprising:
accessing system data associated with a client;
determining known issues to be resolved associated with said client based on said system data;
associating ratings of importance with each of said known issues;

accessing system update preferences associated with said client, said system update preferences representing a minimum system status level with respect to a determined known issue, which has a corresponding rating of importance, wherein different software patches both satisfy said minimum system status level; and determining, performed by a central processor unit, if said client satisfies said minimum system status level based on said update preferences and based on said system data.

2. The method as described in claim 1 further comprising:
determining deviations of said minimum system status level associated with said client.

3. The method as described in claim 2 further comprising:
determining actions required to meet said minimum system status level associated with said client.

4. The method as described in claim 3 wherein said actions include installing a software revision or software patch capable of meeting said minimum system status level associated with said client.

5. The method as described in claim 1 wherein said system data includes a report of all software associated with said client.

6. The method as described in claim 1 wherein said system update preferences includes at least one of said known issues to be resolved.

7. The method as described in claim 1 further comprising:
defining a globally unique ID for at least one of said known issues.

8. The method as described in claim 7 further comprising:
associating said unique ID with at least one recommended fix for at least one of said known issues.

9. A method for managing software comprising:
accessing system data associated with a plurality of clients;
determining known issues to be resolved associated with said plurality of clients based on said system data;
associating ratings of importance with each of said known issues;
accessing system update preferences associated with said plurality of clients, said system update preferences representing a minimum system status level with respect to a determined known issue, which has a corresponding rating of importance, wherein a first software patch installed on a first client and a second software patch, which is different than said first software patch, installed on a second client both satisfy said minimum system status level; and
determining, performed by a central processor unit, if one or more of said plurality of clients satisfies said minimum system status level based on said update preferences and based on said system data.

10. The method as described in claim 9 further comprising:
determining deviations of said minimum system status level associated with one or more of said clients.

11. The method as described in claim 10 further comprising:
determining actions required to meet said minimum system status level associated with one or more of said plurality of clients.

12. The method as described in claim 11 wherein said actions include installing a software revision, a software patch, a critical fix or include modifying system configurations capable of meeting said minimum system status level associated with one or more of said plurality of clients.

13. The method as described in claim 9 wherein said system data includes a report of all software associated with said plurality of clients.

14. The method as described in claim 9 wherein said system update preferences includes at least one of said known issues to be resolved.

15. The method as described in claim 9 further comprising:
generating a report including which of said plurality of clients fails to satisfy said minimum system status level.

16. The method as described in claim 9 further comprising:
providing a graphical user interface for specifying said system update preferences associated with said plurality of clients.

17. A system for managing software comprising:
a central processor unit;
an issue catalog comprising a plurality of known software issue definitions that each have respective ratings of importance;
a software manager for accessing system data associated with one or more clients and for accessing update preferences associated with said one or more clients wherein said software manager determines whether or not each of said plurality of clients meets a minimum system status level based on said update preferences and based on said system data, wherein said minimum system status level is with respect to a known software issue, which has a corresponding rating of importance, and wherein a first software patch installed on a first client and a second software patch, which is different than said first software patch, installed on a second client both satisfy said minimum system status level.

18. The system as described in claim 17 wherein said software manager determines deviations of said minimum system status level for one or more of said plurality of clients.

19. The system as described in claim 18 wherein said software manager determines actions required to fix said deviations of said minimum system status level for one or more of said plurality of clients.

20. The system as described in claim 17 wherein said system update preferences includes at least one of said known issues to be resolved.

21. The system as described in claim 17 further comprising:
a graphical user interface for selecting at least one of said update preferences associated with said one or more clients.

22. The system as described in claim 17 wherein said software manager is remote to one or more of said clients.

23. The system as described in claim 17 wherein said software manager is local to one or more of said clients.

* * * * *